(12) United States Patent
Tuzi

(10) Patent No.: US 10,009,921 B2
(45) Date of Patent: Jun. 26, 2018

(54) ASYNCHRONOUS UBIQUITOUS PROTOCOL

(71) Applicant: Angelo Marino Tuzi, Richmond Hill (CA)

(72) Inventor: Angelo Marino Tuzi, Richmond Hill (CA)

(73) Assignee: Angelo Marino Tuzi, Vaughan, Ontario (CA)

( * ) Notice: Subject to any disclaimer, the term of this patent is extended or adjusted under 35 U.S.C. 154(b) by 33 days.

(21) Appl. No.: 15/463,044

(22) Filed: Mar. 20, 2017

(65) Prior Publication Data

US 2017/0196021 A1    Jul. 6, 2017

Related U.S. Application Data

(63) Continuation of application No. 14/212,089, filed on Mar. 14, 2014, now Pat. No. 9,641,648.

(60) Provisional application No. 61/784,146, filed on Mar. 14, 2013.

(51) Int. Cl.
| | |
|---|---|
| G06F 15/16 | (2006.01) |
| H04W 74/00 | (2009.01) |
| H04W 74/08 | (2009.01) |
| H04W 74/06 | (2009.01) |
| H04W 88/08 | (2009.01) |

(52) U.S. Cl.
CPC ......... *H04W 74/008* (2013.01); *H04W 74/06* (2013.01); *H04W 74/0891* (2013.01); *H04W 88/085* (2013.01)

(58) Field of Classification Search
CPC ............... H04W 74/008; H04W 74/06; H04W 74/0891; H04W 88/085
See application file for complete search history.

(56) References Cited

U.S. PATENT DOCUMENTS

| | | | |
|---|---|---|---|
| 6,714,559 B1 | 3/2004 | Meier | |
| 7,319,671 B1 | 1/2008 | Mohan | |
| 2002/0057709 A1 | 5/2002 | Edmon et al. | |
| 2003/0060161 A1* | 3/2003 | Park | H04L 69/24 455/41.2 |
| 2003/0134614 A1* | 7/2003 | Dye | H04W 84/00 455/406 |
| 2006/0171326 A1* | 8/2006 | Durand | H04L 1/0001 370/252 |
| 2009/0040974 A1 | 2/2009 | Goldhamer | |

(Continued)

OTHER PUBLICATIONS

USPTO, U.S. Office Action relating to U.S. Appl. No. 14/212,276 dated Mar. 9, 2016.

*Primary Examiner* — Michael A Keller
(74) *Attorney, Agent, or Firm* — Rowand LLP

(57) ABSTRACT

Disclosed is a method for requesting data from a set of remote units in a network, the method comprising: defining an Asynchronous Ubiquitous Protocol, the Asynchronous Ubiquitous Protocol comprising a schedule of a plurality of time slots, each time slot defined by a distinct start time and end time pair; broadcasting transmitting instructions to the set of remote units, the transmitting instructions comprising the Asynchronous Ubiquitous Protocol and selection instructions for selecting a time slot from the Asynchronous Ubiquitous Protocol to use for data transmission; and, receiving data transmitted from a remote unit in the set of remote units in accordance with the transmitting instructions.

19 Claims, 9 Drawing Sheets

(56) References Cited

U.S. PATENT DOCUMENTS

| | | |
|---|---|---|
| 2010/0052862 A1 | 3/2010 | Hsieh et al. |
| 2010/0144334 A1* | 6/2010 | Gorokhov ............. H04L 5/0035 |
| | | 455/418 |
| 2010/0157889 A1 | 6/2010 | Aggarwal |
| 2010/0169476 A1* | 7/2010 | Chandrashekar ... H04L 63/1441 |
| | | 709/224 |
| 2011/0211617 A1 | 9/2011 | Li et al. |
| 2011/0238774 A1 | 9/2011 | Maeda |
| 2012/0017216 A1* | 1/2012 | Chan .................... H04W 4/005 |
| | | 718/102 |
| 2012/0063413 A1 | 3/2012 | Kroener et al. |
| 2012/0320812 A1* | 12/2012 | Heinrich .............. H04B 7/2656 |
| | | 370/311 |
| 2013/0301471 A1 | 11/2013 | Brown |
| 2015/0249515 A1* | 9/2015 | Wu ..................... H04L 12/2801 |
| | | 370/442 |

\* cited by examiner

ASYNCHRONOUS UBIQUITOUS PROTOCOL

CROSS-REFERENCE TO RELATED APPLICATIONS

The present application is a continuation of U.S. application Ser. No. 14/212,089 filed Mar. 14, 2014 which claims priority from U.S. provisional patent application No. 61/784,146, filed on Mar. 14, 2013. The contents of these prior applications are incorporated herein by reference.

FIELD

The present disclosure relates to transmission of data and in particular to the transmission of data from a one or more out of a set of remote units to a base unit.

BACKGROUND

Often communication networks include a number of remote units that communicate with a base unit. For example, this type of network can be implemented for an event system network.

Networks such as communication networks often have a base unit station where the individual event reporting units or remote units are monitored. For example, remote units may be located throughout a city or geographical region. The base unit may be responsible for monitoring each remote unit. When an emergency is detected at the remote unit, the remote unit may have to notify the base unit that an emergency is detected.

There may be situations in which a base unit is responsible for many thousands of remote units. If many remote units are transmitting data simultaneously to a base unit, there may be a risk of transmission signals clashing.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION

Figure 1:
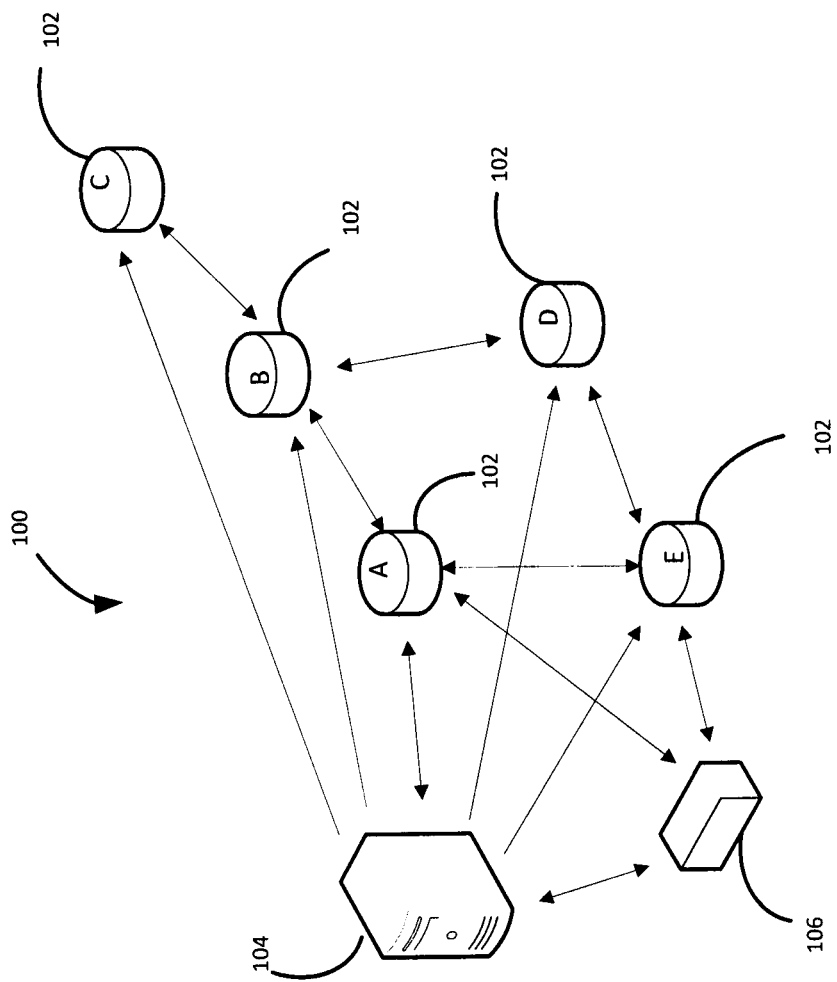
FIG. 1 is a block diagram illustrating a communication network.

According to one aspect disclosed is a method for requesting data from a set of remote units in a network, the method comprising: defining an Asynchronous Ubiquitous Protocol, the Asynchronous Ubiquitous Protocol comprising a schedule of a plurality of time slots, each time slot defined by a distinct start time and end time pair; broadcasting transmitting instructions to the set of remote units, the transmitting instructions comprising the Asynchronous Ubiquitous Protocol and selection instructions for selecting a time slot from the Asynchronous Ubiquitous Protocol to use for data transmission; and, receiving data transmitted from a remote unit in the set of remote units in accordance with the transmitting instructions.

According to another aspect, disclosed is a method of transmitting data from a remote unit to a base, the method comprising: receiving transmitting instructions from the base, the transmitting instructions comprising an Asynchronous Ubiquitous Protocol and instructions for selecting a time slot from the Asynchronous Ubiquitous Protocol, the Asynchronous Ubiquitous Protocol comprising a schedule of a set of time slots each defined by a start time and end time pair; selecting a time slot from the Asynchronous Ubiquitous Protocol within which to transmit remote unit data, the selection based on the instructions for selecting the time slot; and transmitting the data to the base in accordance with the selected time slot.

According to another aspect, disclosed is a communication network for reducing signal collision when transmitting data from one or more remote units out of a set of remote units, the network comprising: a set of one or more remote units, each remote unit arranged to transmit data; a base for communicating with the set of one or more remote units and for managing the communication network, the base associated with a database and with a processor, the processor configured to: define an Asynchronous Ubiquitous Protocol, the Asynchronous Ubiquitous Protocol comprising a schedule of plurality of time slots, each time slot defined by a distinct start time and end time pair; broadcast transmitting instructions the set of remote units, the transmitting instructions comprising the Asynchronous Ubiquitous Protocol and selection instructions for selecting a time slot from the Asynchronous Ubiquitous Protocol to use for data transmission; and, receive data transmitted from one of the remote units in the set of one or more remote units in accordance with the transmitting instructions.

According to another aspect, disclosed is a remote unit for transmitting data across a network to a base, the remote unit comprising: a memory for storing instructions; a processor for executing instructions stored on the memory in order to: receive transmitting instructions from the base, the transmitting instructions comprising an Asynchronous Ubiquitous Protocol and instructions for selecting a time slot from the Asynchronous Ubiquitous Protocol, the Asynchronous Ubiquitous Protocol comprising schedule of a set of time slots each defined by a start time and end time pair; select a time slot from the Asynchronous Ubiquitous Protocol within which to transmit remote unit data, the selection based on the instructions for selecting the time slot; and transmit the data to the base in accordance with the selected time slot.

Exemplary Communication Network

For convenience, like numerals in the description refer to like structures in the drawings. Referring to FIG. 1, an exemplary communication network is illustrated generally by numeral 100. The communication network 100 includes one or more remote units 102 and one or more base unit stations 104 (or base units). The communication network 100 may also include a base collector 106.

The remote units 102 can be configured to transmit data to the base unit 104 or to one or more neighboring remote units 102 or to a nearby base collector 106. The remote units 102 can also be configured to transmit a polling message such as an indication that the remote unit 102 is active or an indication that the remote unit 102 is operational (in that it can function to transmit a message to the base unit 104).

The base unit 104 and remote units 102 can transmit data over a Radio Frequency (RF) network. Similarly, the base collectors 106 can transmit data over a RF network. For example, the base unit 104 and remote units 102 may be configured to transmit data using a single RF channel. The base unit 104 can have a range of transmission that allows it to transmit data to all of the remote units 102. For instance, the base unit 104 can broadcast a message over an RF channel to each remote unit 102 within its transmission range. The transmission range of the base unit 104 is depicted in FIG. 1 using the directed arrows. The direction of the arrows indicates the direction of transmission. The base unit 104 can transmit data to each of remote units 102 labelled A, B, C, D and E and to the base collector 106.

In one or more embodiments, the base unit 104 can broadcast instructions and messages and the base collector (s) 106 can rebroadcast the received instructions. Such a configuration may be useful in implementations in which the base unit 104 transmission does not reach all of the desired areas of the communication network 100. This may occur if there are remote units 102 that are not within the transmission range of the base unit 104.

The base unit 104 is responsible for managing the communication with each remote unit 102, handling event messages transmitted from the remote units 102, and managing and updating a database of remote units 102 and event codes.

Each remote unit 102 has a limited range of transmission. For example, a remote unit 102 may only be capable of transmitting data to a neighboring remote unit 102. Referring to FIG. 1, remote unite 102 A can transmit data to remote unit 102 B, the base unit 104, the base collector 106 and remote unit 102 E. Remote unit 102 B can transmit data to remote unit 102 A, remote unit 102 C, and remote unit 102 D. Remote unit 102 C can transmit data to remote unit 102 A. Remote unit 102 D can transmit data to remote unit 102 B and remote unit 102 E. Remote unit 102 E can transmit data to remote unit 102 A, remote unit 102 B and the base collector 106.

The remote units 102 can receive data from other remote units 102 (assuming the other remote units 102 have adequate transmission range) and from the base unit 104.

Depending on the data (e.g. on the contents of the data) the remote units 102 may retransmit received data. For example, data that is received from another remote unit 102 may be retransmitted for receipt by another remote unit 102 or a base collector 106 or the base unit 104 (if within transmission range).

Thus, for remote unit 102 C to transmit data to the base unit 104, the data can follow one of the following paths:
1. Remote unit 102 C to remote unit 102 B to remote unit 102 A to the base unit 104;
2. Remote unit 102 C to remote unit 102 B to remote unit 102 A to the base collector 106 to the base unit 104;
3. Remote unit 102 C to remote unit 102 B to remote unit 102 A to remote unit 102 E to the base collector 106 to the base unit 104;
4. Remote unit 102 C to remote unit 102 B to remote unit 102 D to remote unit 102 E to the base collector 106 to the base unit 104;
5. Remote unit 102 C to remote unit 102 B to remote unit 102 D to remote unit 102 E to remote unit 102 A to the base collector 106 to the base unit 104; and
6. Remote unit 102 C to remote unit 102 B to remote unit 102 D to remote unit 102 E to remote unit 102 A to the base unit 104.

Each transmission from a remote unit 102 to another remote unit 102 can be identified as a hop. In one or more embodiments, if a remote unit 102 receives a data transmission from another remote unit 102 the receiving remote unit 102 can include further identifying data ("hop data") to the transmission to indicate that it retransmitted the data.

The remote units 102 can monitor the data that is transmitted from neighboring remote units 102 (i.e. remote units 102 within transmission range). For example, with reference to FIG. 1, remote unit 102 A can monitor transmissions emanating from remote unit 102 B, and remote unit 102 E. Remote unit 102 A can also monitor transmissions from the base collector 106. Remote unit 102 B can monitor transmissions emanating from remote unit 102 A, remote unit 102 C, and remote unit 102 D. Remote unit 102 C can monitor transmissions emanating from remote unit 102 A. Remote unit 102 D can monitor transmissions emanating from remote unit 102 B and remote unit 102 E. Remote unit 102 E can monitor transmissions emanating from remote unit 102 A and remote unit 102 B.

A remote unit 102 that transmits data to a neighboring remote unit 102 (i.e. a hop) can monitor the transmissions emanating from that neighboring remote unit 102 (because it is within transmission range). For example, remote unit 102 D may transmit data to remote unit 102 E to for retransmission. Remote unit 102 D may then determine that the data has not been retransmitted after a pre-determined period of time and remote unit 102 D may then retransmit the data to remote unit 102 B (another neighbor on the hop list) for retransmission. Remote unit 102 D may then, from monitoring remote unit 102 B, determine that the data was retransmitted (e.g. to remote unit 102 A). Similarly, remote unit 102 B will then monitor the retransmissions from remote unit 102 A to ensure that the data was transmitted all the way to the base unit 104. The remote unit 102 D may then change the order of an ordered (or prioritized) hop list that it maintains.

Each remote unit 102 can include (e.g. stored in an associated memory) a list of remote units 102 that are within its transmission range (i.e. that it can transmit data to). This list may be identified as a "hop list". Similarly, the remote unit 102 can order the hop list to create an ordered list of remote units 102. The list can be ordered based on one or more criteria such as location, past efficiency, hop distance, rank, communications facilities and the number of different routes at the units in the hop list, etc. This ordered hop list can be stored in a database that is associated with the remote unit 102. The ordering of neighboring remote units 102 in the ordered list can be amended or changed by the remote unit 102 that is storing the ordered list. This can happen, for example, in response to network conditions or a change in a status of a neighboring remote units 102 (e.g. if it is determined that the neighboring remote unit is not functioning properly. This can also happen, for example, if the remote unit 102 discovers one or more new (i.e. previously unknown or untested) remote units 102 that have a better set of criteria than existing units in the hop list.

In one or more embodiments, the remote units 102 are event reporting units. The remote units 102 may be associated with event systems. The event systems can be installed on buildings, for example, in order to detect unauthorized access to the building. For example, the event system can have sensors (such as cameras or motion sensors) that detect whether a person is attempting to access a building. The remote unit 102 may be alerted by the event system or the sensors and may automatically transmit a message to the base unit 104 (e.g. using hops) notifying it of the potential unauthorized access to the building.

The remote units 102 may be constantly listening on a particular RF channel for messages or data transmitted from the base unit 104 and from other remote units 102 that are within frequency range. The remote units 102 may gather network configuration information through such information.

In one or more embodiments there may be many more remote units 102 or many more base stations 106 than are depicted in FIG. 1. For example, the communication network 100 may cover the geographic region of a large city and may include over 100,000 remote units 102.

One or more base collectors 106 can be distributed throughout the communication network 100. The base collectors 106 can be used to collect data from neighboring remote units 102 (e.g. remote units 102 for which the particular base collector 106 is in transmission range). The base collector 106 may have enough transmission range to transmit data to the base unit 104. Alternatively, the base collectors 106 may be configured to transmit data to the base unit 104 on an alternative channel or using a different network or different protocol.

In one or more embodiments, the communication network 100 can be divided into geographical regions. The geographical regions may be distinct in that each remote unit 102 is in at most one geographical region. Each base collector 106 may be associated with a distinct geographical region. For example, each geographical region may be associated with a distinct base collector 106.

In one or more embodiments, the base collectors 106 can be configured to transmit data to and received data from the base unit 104 over a separate communication channel or using a separate communication protocol. For example, the base stations 106 can communicate with the base unit 104 using a different RF channel than is used by the remote units 102. By way of further example, the base stations 106 can communicate with the base unit 104 using Internet Protocol.

The data transmitted from a remote unit 102 destined for the base unit 104 can include the identity of the remote unit 102 (e.g. serial number) and an identification of the type of event being reported. The identification of the type of event being reported can include an event code, which may be decipherable at the base unit 104. The geographic location of the remote unit 102 or its associated event system can be stored in a memory (e.g. a database) associated with base unit 104. For example, there may be an event code representing a broken window in a house where the event system is installed and there may be a different event code for an unauthorized access through a door to a building where the event system is installed.

It is understood that the data can be encrypted.

At any given time, the number of remote units 102 that have an event to report is likely much fewer than the total number of remote units 102 within the communication network 100. However, there may be times when the number of remote units 102 that have an event to report is much closer to the total number of remote units 102 within the communication network 100, such as a weather-related event or power outage or other event that effects most event systems.

Figure 2:
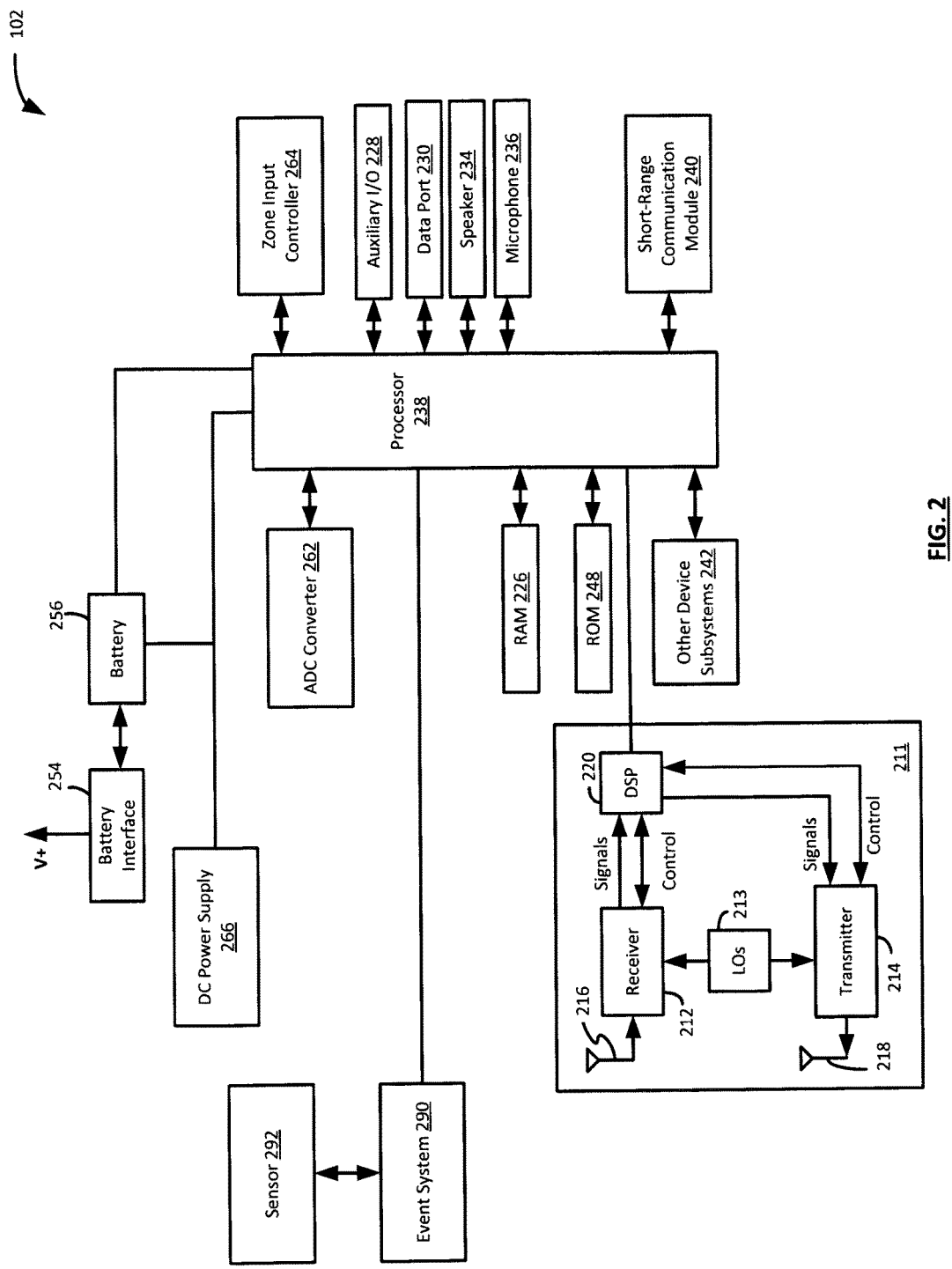
FIG. 2 is a block diagram illustrating components of a remote unit.

FIG. 2 shows the components of an exemplary remote unit 102 in detail. The remote unit 102 may be associated with an event system at a particular address. For example, the remote unit 102 can receive sensor information from one or more sensors in the event system or the remote unit 102 can receive sensor data from the event system.

The remote unit 102 can be a two-way communication device having the capability of receiving and transmitting data to other communication systems (such as other remote units 102, base collectors 106 and base unit 104). For example, the remote unit 102 may be configured to transmit data using various protocols, media and transmission systems including RF, Z-Wave, ZigBee, Telephone, Cellular, WiFi, Infrared, Internet (IP), GPS module and Laser. In one or more embodiments, the transmission range of the remote unit 102 may be limited to a selection of nearby remote units 102 (or nearby base collectors 106 or base unit 104)>

The remote unit 102 includes a communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the communication subsystem 211 depends on the communication network in which the remote unit 102 is intended to operate.

The remote unit 102 includes a processor 238, which controls general operation of the remote unit 102. The processor 238 can interact with additional device subsystems such as a random access memory (RAM) 226, a read only memory (ROM) 248, a data port 230 a short-range communications subsystem 240 such as Bluetooth™ for example, and any other device subsystems or peripheral devices generally designated at 242.

Operating system software used by the processor 238 may be stored in a persistent store such as a ROM 248 or similar storage element (not shown). The operating system, specific device applications, or parts thereof, may be temporarily loaded into a volatile store such as RAM 226.

The processor 238, in addition to its operating system functions, enables execution of software applications on the remote unit 102. A predetermined set of applications, which control basic device operations, is installed on the remote unit 102 during its manufacture. These basic operations typically include data communication applications, for example. Additionally, applications may also be loaded onto the remote unit 102 through the communication network 100, an auxiliary I/O subsystem 228, data port 230, short-range communications module 240, or any other suitable subsystem 242, and installed by a user in RAM 226 or ROM 248, for execution by the processor 238. Such flexibility in application installation increases the functionality of the remote unit 102 and may provide enhanced on-device features, communication-related features, or both.

The processor 238 can also be associated with an analog to digital convertor (ADC) 262, a zone input controller 264 and a DC power supply 266. The ADC is connected to the processor 238 and is responsible for converting analog signals to digital signals and vice versa. The zone input controller 264 is connected to the processor 238 and is responsible for mapping and controlling the communication between the remote unit 102 and other devices at the premises where the associated event system is installed.

The short range communication module 240 provides for communication between the remote unit 102 and different systems or devices, which need not necessarily be similar devices. For example, the short range communication module 240 may include an infrared device and associated circuits and components, or a wireless bus protocol compliant communication mechanism such as a Bluetooth® communication module to provide for communication with similarly-enabled systems and devices.

In some example embodiments, the auxiliary input/output (I/O) subsystems 228 may include an external communication link or interface, for example, an Ethernet connection. The remote unit 102 may include other wireless communication interfaces for communicating with other types of wireless networks; for example, a wireless network such as an orthogonal frequency division multiplexed (OFDM) network.

The remote unit 102 also includes a battery 256 as a stand-by power source. The battery 256 can be used in the event of a power outage, for example. In one or more embodiments, the battery 256 can be rechargeable that may be charged, for example, through charging circuitry coupled to a battery interface 254 such as the data port 230. The battery 256 can provide electrical power to at least some of the electrical circuitry in the electronic device 102, and the battery interface 254 provides a mechanical and electrical connection for the battery 256. The battery interface 254 is coupled to a regulator (not shown) which provides power V+ to the circuitry of the remote unit 102.

The processor 238 may also be connected to an event system 290, such as an event detection system in a building or a home monitoring system. The event system 290 can be connected to at least one sensor 292. The sensor 292 can be of various types, such as a motion sensor (or camera), specific sensors that monitor the entrance of individuals into buildings, access control units, process control systems, which may be automated.

Figure 3:
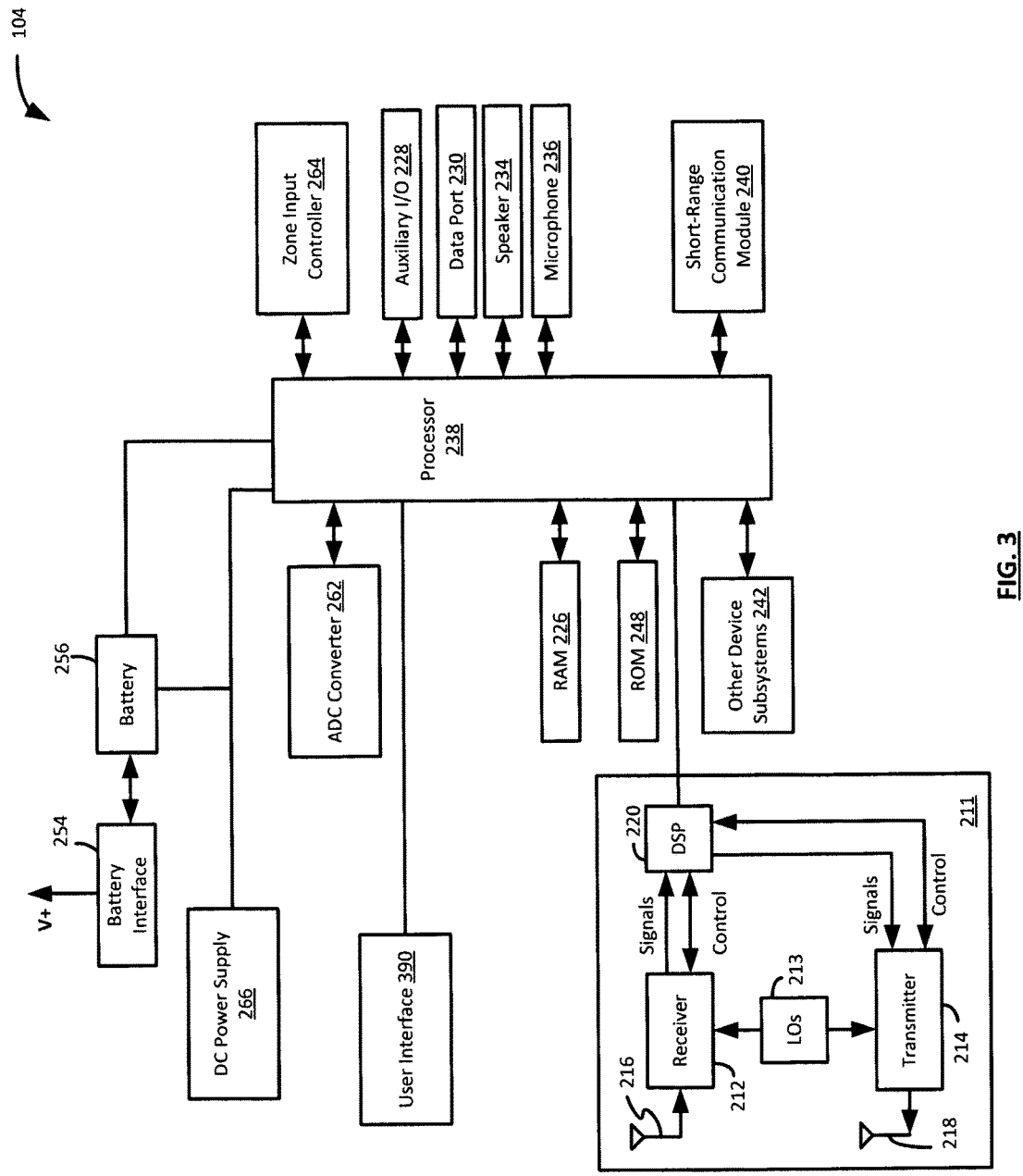
FIG. 3 is a block diagram illustrating components of a base unit.

FIG. 3 shows the components of an exemplary base unit 104 in detail. Generally, the base unit 104 manages and monitors various components and conditions in the communication network 100.

The base unit 104 can be a two-way communication device having the capability of receiving and transmitting data to other communication systems (such as remote units 102 and base collectors 106). For example, the base unit 104 may be configured to transmit data using various protocols, media and transmission systems including RF, Z-Wave, ZigBee, Telephone, Cellular, WiFi, Infrared, Internet (IP), GPS module and Laser. The base unit 104 can be configured to broadcast messages to all of the components in the communication network 100. In other words, the base unit 104 can have a transmission range that reaches or all of the components in the communication network 100. It is recognized that in some implementations the topology of the communication network 100 may be such that the transmission range of the base unit 104 does not extend to reach each remote unit 102. In such implementations the transmission range of the base unit 104 need only reach the base collectors 106 which can in turn retransmit the data received from the base unit 104.

The base unit 104 can be a communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the communication subsystem 211 depends on the communication network (e.g. the communication network 100) in which the base unit 104 is intended to operate.

The base unit 104 includes a processor 238, which controls general operation of the base unit 104. The processor 238 can interact with additional device subsystems such as a random access memory (RAM) 226, a read only memory (ROM) 248, a data port 230 a short-range communications subsystem 240 such as Bluetooth™ for example, a user interface 390, and any other device subsystems or peripheral devices generally designated at 242.

Operating system software used by the processor 238 may be stored in a persistent store such as a ROM 248 or similar storage element (not shown). The operating system, specific device applications, or parts thereof, may be temporarily loaded into a volatile store such as RAM 226.

The processor 238, in addition to its operating system functions, enables execution of software applications on the base unit 104. A predetermined set of applications, which control basic device operations, is installed on the base unit 104 during its manufacture. These basic operations typically include data communication applications, for example. Additionally, applications may also be loaded onto the base unit 104 through the communication network 100, an auxiliary I/O subsystem 228, data port 230, short-range communications module 240, or any other suitable subsystem 242, and installed by a user in RAM 226 or ROM 248, for execution by the processor 238. Such flexibility in application installation increases the functionality of the base unit 104 and may provide enhanced on-device features, communication-related features, or both.

The processor 238 can also be associated with an analog to digital convertor (ADC) 262, a zone input controller 264 and a DC power supply 266. The ADC is connected to the processor 238 and is responsible for converting analog signals to digital signals and vice versa. The zone input controller 264 is connected to the processor 238 and is responsible for mapping and controlling the communication between the base unit 104 and other devices (such as the remote units 102 or the base collectors 106 or event and monitoring devices in the monitored premises where the event system is located).

The short range communication module 240 provides for communication between the base unit 104 and different systems or devices, which need not necessarily be similar devices. For example, the short range communication module 240 may include an infrared device and associated circuits and components, or a wireless bus protocol compliant communication mechanism such as a Bluetooth® communication module to provide for communication with similarly-enabled systems and devices.

In some example embodiments, the auxiliary input/output (I/O) subsystems 228 may include an external communication link or interface, for example, an Ethernet connection. The base unit 104 may include other wireless communication interfaces for communicating with other types of wireless networks; for example, a wireless network such as an orthogonal frequency division multiplexed (OFDM) network.

The base unit 104 also includes a battery 256 as a stand-by power source. The battery 256 can be used in the event of a power outage, for example. In one or more embodiments, the battery 256 can be rechargeable that may be charged, for example, through charging circuitry coupled to a battery interface 254 such as the data port 230. The battery 256 can provide electrical power to at least some of the electrical circuitry in the electronic device 102, and the battery interface 254 provides a mechanical and electrical connection for the battery 256. The battery interface 254 is coupled to a regulator (not shown) which provides power V+ to the circuitry of the base unit 104.

The user interface 390 can include an input system or an output system or both. For example, the input system can include a keyboard, touchscreen, or a mouse and the output system can include a speaker or display. The input system can be used to enter data into, access data from, or organize data in memory (e.g. ROM 248). The output system can be used to display or provide data from memory (e.g. RAM 226 or ROM 248).

The base unit 104 can monitor the conditions of the communication network 100. For example, the base unit 104 can listen to transmissions on the communication network 100 and can use embedded statistical information in the messages, and data from polling remote units 102 to determine the levels of usage of the network resources and to determine the congestion on one or more transmission path in the communication network 100. The base unit 104 can keep historical data concerning the usage levels of the communication network 100. This historical data can be used to determine whether the communication network 100 (or specific transmission paths) is experiencing an increasing in traffic for example.

Asynchronous Ubiquitous Protocol

In one or more embodiments, the base unit 104 periodically broadcasts a request message to the remote units 102 in the communication network 100. The request message can be a message that requests for any event data to be transmitted from the remote units 102. For example, if a remote unit 102 is experiencing a particular event it will transmit data identifying the event (e.g. an event code) to the base unit 104 in response to the request message.

The request message can identify or include Asynchronous Ubiquitous Protocol. The Asynchronous Ubiquitous Protocol can be defined at the base unit 104 and can be a schedule of a plurality of time slots, with each time slot defined by a distinct start time and end time pairs.

The Asynchronous Ubiquitous Protocol is a schedule for organizing the transmission of data from remote units 102 to the base unit 104 (or to base collectors 106). The Asynchronous Ubiquitous Protocol sets a length of time for one or more data transmissions from the remote units 102. The Asynchronous Ubiquitous Protocol (e.g. the length of time for the data transmissions) repeats periodically so that the Asynchronous Ubiquitous Protocol can be arranged (by the base unit 104) to begin after a predetermined amount of time (e.g. 100 milliseconds) after the completion of the previous Asynchronous Ubiquitous Protocol has completed.

Figure 4:
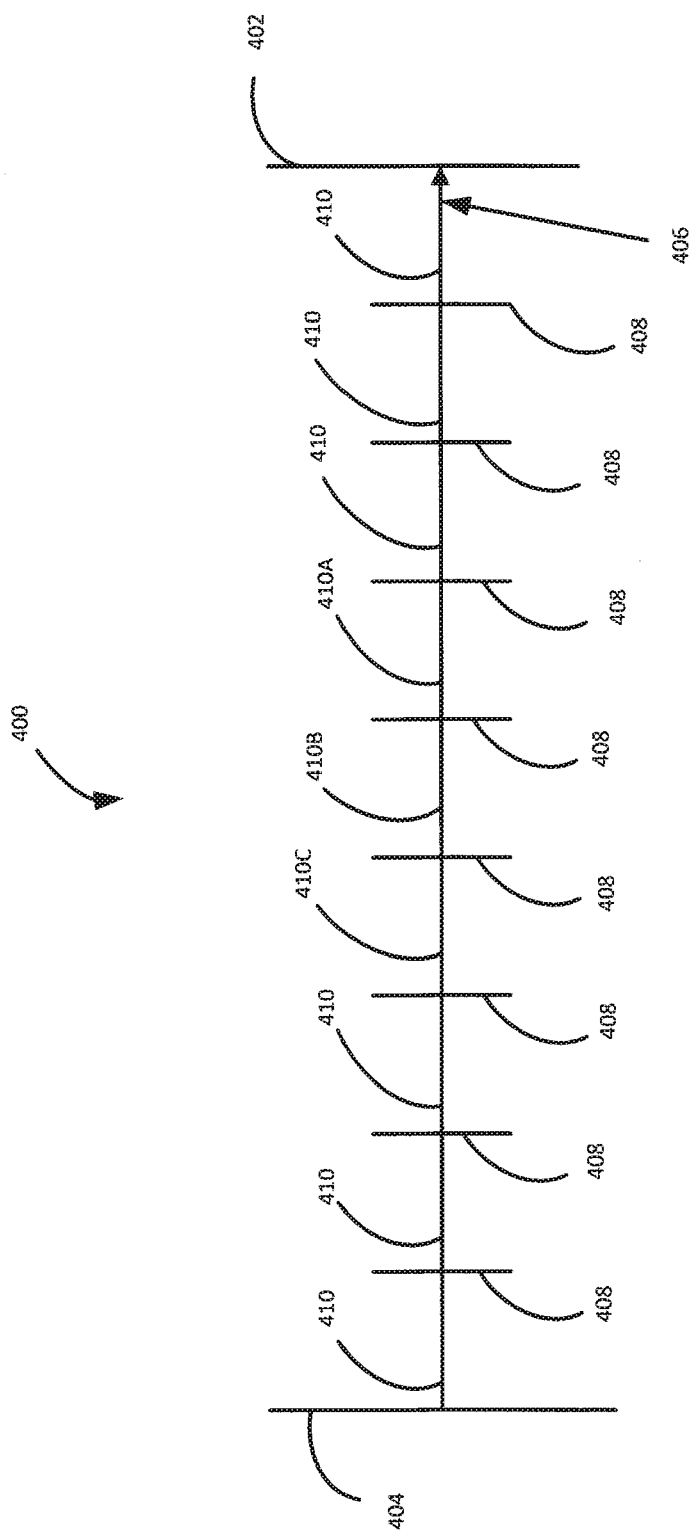
FIG. 4 is a schematic diagram of an exemplary Asynchronous Ubiquitous Protocol.

FIG. 4 depicts a schematic diagram of an exemplary Asynchronous Ubiquitous Protocol (APP) 400. The AUP 400 intended to represent a schedule of future time slots within which the remote units 102 can transmit event data, if necessary. The AUP 400 includes an AUP start time 402, an AUP end time 404, and a set of slots 408 defined by start times and end times 410 all on a time duration 406 (e.g. milliseconds). For example, each time slot 408 is defined by a start time and end time pair (e.g. two successive delineations 410 in the time duration 406).

The time duration 406 is such that there is a set period of time between the AUP start time 402 and the AUP end time 404.

The AUP start time 402 is the precise time when the AUP 400 is set or synchronized to begin and the AUP end time 404 is the precise time when the AUP 400 is set or synchronized to end. The AUP start time 402 and the AUP end time 404 can be periodic start and end times. For example, the AUP start time 402 and the AUP end time 404 can be synchronized by the base unit 104 so that each remote unit 102 is operating with the same periodic AUP start time 402 and AUP end time 404. By way of further example the AUP start time 402 (and corresponding AUP end time 404) can represent multiple periodic start times throughout a time period (e.g. a day) such that no complete AUP 400 overlaps with a subsequent AUP 400.

Between the AUP start time 402 and the AUP end time 404 are a number of time slots 408 defined by time delineations 410. The time delineations 401 may also be referred to as start times 410 or end times 410 (or pairs of start times 410 and end times 410) in reference to a time slot 408. The time slot 408 represents the time period between two successive time delineations 410. The length of time in a time slot 408 can be arranged or configured (e.g. by the base unit 104) to be an adequate length of time for transmitting an event occurrence for example.

The base unit 104 (e.g. through the operation of its processor 238) can be configured to dynamically change the AUP 400 depending on the network conditions as monitored by the base unit 104. For example, the base unit 104 may determine that the network performance conditions are slower (i.e. more congested) than normal, in such a case it may increase the number of time slots 408 and thus lengthen the AUP duration. Consequently, the base unit 104 may lengthen the time between the AUP start time 404 and the AUP end time 402. By way of further example, the base unit 104 may determine (from monitoring the communication network 100) that the network performance conditions are faster than normal (i.e. less congested). In such a situation the base unit 104 may decrease the number of time slots 408 and thus decrease the AUP duration.

Exemplary Method of Operation

Figure 5:
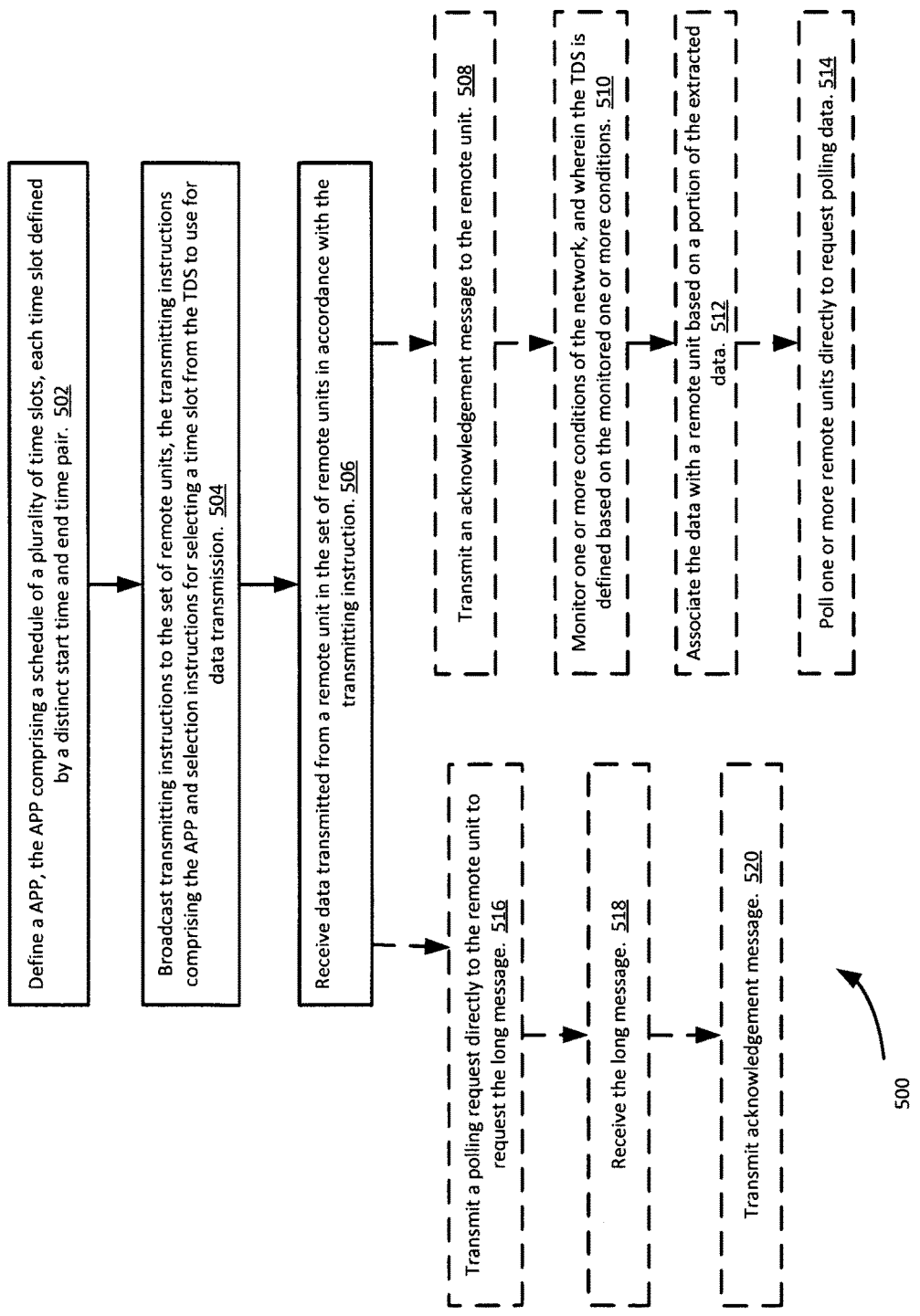
FIG. 5 is a flow chart depicting a method for requesting data from a set of remote units in a network.

FIG. 5 depicts an exemplary method 500 of requesting data from a set of remote units 102 in a network 100. The method 500 may be carried out using a processor 238 operating on instructions stored in a memory 226, 248 of the base unit 104.

At 502, an Asynchronous Ubiquitous Protocol ("APP") is defined. The AUP 400 can be a schedule of a plurality of time slots, each time slot defined by a distinct start time and end time pair. For example, the AUP 400 can be the AUP 400 described in FIG. 4.

The start time and end time pairs can define a set of non-overlapping time slots within which data may be transmitted. For example, the AUP 400 can be made up of 10 time slots each of 150 milliseconds in length. In another example, the time slots are not of uniform length.

The base unit 104 can be responsible for synchronizing the remote units 102 in the network 100. For example, the base unit 104 may inform the remote units 102 (or the base collectors 106) of the time throughout the day when the AUP 400 is scheduled to start (e.g. when the AUP start time 404 will occur). In other words, the base unit 104 can synchronize the other components in the communication network 100 to operate with the same start times for the AUP 400. For example, the base unit 104 may inform the remote units 102 (or the base collector 106) that the AUP start time 404 occurs every 500 milliseconds. The base unit 104 can reset or re-synchronize the components in the communication network 100 depending on changes to the AUP 400, for example, or depending on communication network 100 conditions (as determined at the base unit 104).

At 504, the transmitting instructions can be broadcast to the set of remote units 102. The transmitting instructions can include the AUP 400 and selection instructions for selecting a time slot 408 from the AUP 400 to use for data transmission. The transmitting instruction can also include synchronization instructions for synchronizing the remote units 102 (and base collector 106, e.g.) with the AUP start times 404.

The base unit 104 can be configured to periodically transmit APPs 402 to the remote units 102 in the network 100. The base unit 104 may broadcast the AUP 400 to the remote units 102 in response to changes made to the AUP 400. Each time slot 408 in the AUP 400 may be enumerated for ease of reference.

The instructions for selecting a time slot 408 from the AUP 400 can include selecting a time slot 408 based on selected digits of the serial number of the remote unit 102. For example, the base unit 104 may instruct the remote units 102 to select a time slot 408 based on the last two digits of the remote unit's 102 serial number. By way of further example, the base unit 104 may provide a mapping to the remote units 102 (e.g. along with the instructions) that provides a mapping from the last two digits (or of the selected digits) of the serial number of the remote unit 102 to a specific time slot 408.

The instructions for selecting a time slot 408 from the AUP 400 can include instructions to select a time slot 408 based on a pseudo-random number. For example, the instructions can include a request to the remote units 102 (or particular remote units 102) to use a random or pseudo-random number generator to select one slot to use to transmit data. The pseudo-random number that is generated can then be mapped to one of the enumerated time slots 408. For example, the base unit 104 can provide the remote units 102 with a mapping to be used to map the generated number (e.g. pseudo-random number) to a time slot 408.

The instructions for selecting a time slot 408 from the AUP 400 can include instructions to select a time slot based on the geo-location of the remote unit 102. For example, the instructions can include a mapping from specific geo-locations to specifically enumerated time slots 408. In one or more embodiments, the base unit 104 can instruct specific remote units 102 to use specific time slots 408 in the AUP 400.

At 506 data transmitted from a remote unit 102 in the set of remote units is received in accordance with the transmitting instructions. The remote unit 102 can begin transmission of the data at or after the start time 410 of its time slot 408 and finish the transmission of the data before or at the end time 410 of its time slot 408.

In one or more embodiments, the data received at the base unit 104 and that is transmitted from one or more of the set of the remote units 102 is extracted from the time slot 408. For example, the base unit 104 can extract the data during the time slots 408 set out in the AUP 400.

For example, the base unit 104 can determine the commencement of the first time slot 408 (in the enumerated time slots 408 in the AUP 400) and can process the data in each succeeding time slot. The processing of the data can include extracting or reading the data within the time slot 408. The data extracted from within each time slot can be separately processed and stored in a memory 226, 248 associated with the base unit 104.

For example, data from remote unit 102 A can be received within the first time slot 408, data from remote unit 102 B can be received within the second time slot 408 and data from remote unit 102 C can be received within the third time slot 408. By way of further example, data from remote unit 102 A can be received within the second time slot of a first AUP 400, then data from remote unit 102 B can be received within the seventh time slot of the first AUP 400, and then data from remote unit 102 C can be received within the third time slot of the second AUP 400 (e.g. after data from remote unit 102 B is received).

In one or more embodiments, the data may be transmitted from the remote units 102 using a single RF channel. Similarly, the instructions transmitted from the base unit can be broadcast on the same single RF channel.

Optionally, at 508 an acknowledgment message is transmitted to the remote unit 102. The acknowledgment message can be transmitted from the base unit 104 to the remote unit 102. For example, the acknowledgement message can be broadcast to the remote units and can include information that identifies the remote unit 104 as the recipient. The acknowledgment message can consist of an indication that the base unit 104 received the data transmitted from the remote unit 102.

In an embodiment of the network 100, the base unit 104 may include the information of the transmission path, through which it receives a message from a remote unit 102, in an acknowledgment message. By broadcasting the acknowledgment message in the network 100, all remote units 102 receive the transmission path information. Each remote unit 102 contains a database (e.g. in memory) of all routes that reach the base unit 104 via different remote units 102 and is capable to make a complete view of the network topology, to find all possible and the best path towards base unit 104.

Optionally, at 501, one or more conditions of the network 100 can be monitored by the base unit 104. The base unit 104 can then define (or redefine) the AUP 400 based on these monitored conditions. The monitoring can be an ongoing process or can occur periodically (e.g. the base unit 104 can run multiple concurrent processes). For example, the base unit 104 can monitor the network during each occurrence of the AUP 400 (e.g. in between the AUP start time 404 and AUP end time 402).

The conditions that are monitored are generally those that reflect the congestion or level of traffic (e.g. data transmissions) on the network 100. By way of further example, the conditions that are monitored can include monitoring a specific remote unit 102 or a specific geographical location which may contain a set of remote units 102. In yet a further example, the conditions that are monitored may include monitoring the signal strength on one or more RF channels that may be used on the network 100.

In one or more embodiments, one or more conditions that are monitored can include the rate of retransmission of data across the network 100. For example, an increased rate of data retransmission can imply that the network 100 is becoming more congested. In such a case, the base unit 104 may redefine the AUP 400 to include longer duration of an AUP 400 and consequently more time slots 408 in the AUP 400. This may be able to accommodate data from remote units that may not otherwise be able to be sent on time (e.g. by the start time 410 of the time slot 408).

Another condition that can be monitored can be the number of poll request from remote units 102. Remote units 102 may transmit poll requests for various reasons, such as to help establish a transmission route, to initiate a communication session with the base unit 104, or for various other reasons. However, an increase in the number of poll requests can imply that the network 100 is becoming more congested. This can be because more remote units 102 are attempting to establish more efficient transmission routes, for example. In such a case, the base unit 104 may redefine the AUP 400 to include longer duration (and potentially fewer) time slots 408. This may be able to accommodate data from remote units that may not otherwise be able to be sent on time (e.g. by the start time 404 of the time slot 408).

Another condition that can be monitored can be the usage of the time slots 408 in the AUP 400. For example, an increase in the number of timeslots within which data is not transmitted or included can imply that the communication network 100 can handle a higher rate of data transmissions involving the remote units 102. In response to this condition of the communication network 100, the base unit 104 may redefine the AUP 400 to reduce the number of time slots 408 and the consequently length of time for an AUP 400. This may result in faster transmission of data from the remote units 104 that have events to report because of the shorter wait time between AUP start times 404. As noted, upon reconfiguration of the AUP 400, the base unit 104 can resynchronize the remote units 102 (to be on schedule with the AUP start times 404).

Optionally, at 512, the data is associated with a remote unit 102 based on a portion of the extracted data. In other words, the data transmitted between an AUP start time 404 and AUP end time 402 pair is associated with a single remote unit 102. Such data can include an identification of the remote unit 102 from which it originated. When the base unit 104 extracts or reads or processes such data, the base unit 104 will be able to determine from the data the identity of a remote unit 102. The base unit 104 can the associate the received data with that remote unit 102 (e.g. in a memory 226, 248 associated with the base unit 104).

In an embodiment, at 514, one or more remote units 102 is polled directly to request polling data. For example, the base unit 104 can transmit a polling message to a particular remote unit 102 to request polling data. For example, the polling message can be broadcast and can include the identity of the remote unit 102 that is being polled.

The polling data can include a confirmation of the existence that a functioning transmission path from the remote unit 102 to the base unit 104. The polling data can include an identification of the hops taken along the path. For example, referring to FIG. 1, the transmission path from remote unit 102 C to the base unit 104 can be as follows: remote unit 102 C to remote unit 102 B to remote unit 102 A to the base unit 104. The polling data transmitted from remote unit 102 C can identify this transmission path.

The polling request from the base unit 104 can include a request for the remote unit 102 to transmit the polling data (or to use) a particular transmission path. The base unit 104 can maintain a topology of the transmission paths in the communication network 100 in memory 226, 248. The polling data that is received from a remote unit 102 can be used to update this topology information. If not polling data is received after a predetermined or set period of time, then the base unit 104 will assume that the particular transmission path is not operational.

The data transmitted from the remote unit 102 can include a request to transmit a long message. The long message can be a message that takes longer to transmit than a duration of the time slot 408. The duration of the time slot 408 is the time that elapses between the start time 410 and the end time 410 pair that define the time slot 408 under consideration. For example, the remote unit 102 may be synchronized to transmit data within one of the time slots in the AUP 400, which may be occurring periodically. The remote unit 102 may determine that its message cannot be fully transmitted within the time period allotted to its time slot 408. The request to transmit a long message can also include the length of the long message.

If the data transmitted includes a request to transmit a long message then, optionally, at 516, in response to receiving the data transmitted from the remote unit 102, a polling request is transmitted directly to the remote unit 102 to request the long message. The polling request can include a time period within which the remote unit 102 can transmit the long message. The time period can be selected by the base unit 104 to accommodate the transmission of the long message, based on the expected length of the long message (which may have been provided in the request to transmit a long message or which may be previously known to the base unit 104). The starting time of the time period can be selected to be such that the time period does not overlapping with an upcoming AUP 400. Similarly, if necessary, the base unit 104 can redefine the AUP 400 to accommodate the time period for the long message.

At 518 the long message can be received at the base unit 104. For example, the long message can be transmitted during the time period allotted by the base unit 104 and can be transmitted in response to the polling request sent directly to the remote unit 102 at 516.

At 520, an acknowledgement message can be transmitted from the base unit 104 to the remote unit 102. The acknowledgement message can indicate that the base unit received the long message. The acknowledgment message can be broadcast with an indication of the recipient remote unit 102 or it can be transmitted directly to the remote unit 102.

Figure 6:
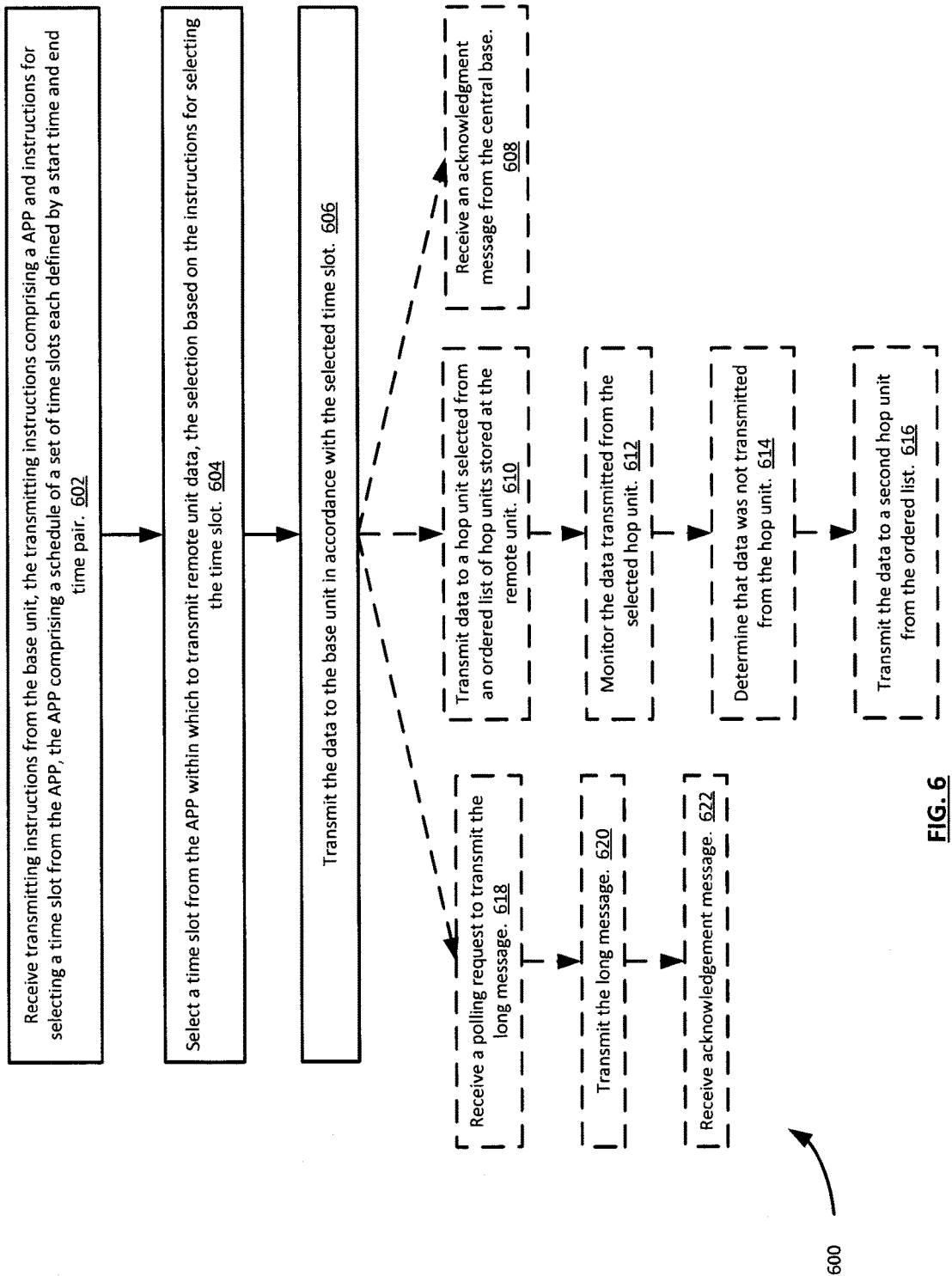
FIG. 6 is a flow chart depicting a method of transmitting data from a remote unit to a base unit.

FIG. 6 depicts an exemplary method 600 of transmitting data from a remote unit 102 to a base unit 104. The method 600 described in relation to FIG. 6 can be carried out by a processor 238 executing instructions stored on a memory 226, 248 associated with the base unit 104.

At 602 transmitting instructions are received from the base unit 104. The transmitting instructions can include an AUP 400 and instructions for selecting a time slot 408 from the AUP 400. The AUP 400 can include a schedule of a set of time slots 408 each defined by a start time 410 and end time 410 pair. For example, the AUP 400 can be as described in relation to FIG. 4.

The transmitting instructions are received at a remote unit 102. The remote unit 102 can be constantly listening for data on the communication network 100. For example, the remote unit 102 can be listening for messages that are broadcast from the base unit 104, the remote unit 102 can be listening for polling messages transmitted from the base unit 104, the remote unit 102 can be listening for transmissions from other remote units within its frequency range, and the remote unit 102 can be listening for transmissions directly to it from the base unit 104.

The remote unit 102 can be an event reporting unit or another type of monitoring unit or system. The remote unit 102 can be associated with a building (e.g. a home or commercial establishment) that has a street address. Upon installation of the remote unit 102 or shortly thereafter the address of the remote unit 102 and the identity (e.g. serial number) of the remote unit 102 is stored in a memory associated with the base unit 104. This can be performed manually, for example, through an interface with the base unit 104. Address information and generally customer information can be stored in database (e.g. a memory) at the base unit 104 before deployment of a remote unit 102 in the field. The remote unit 102 can then be activated and its serial number can be used to associate reported data (e.g. an event message from the remote unit 102) with a client profile that may be stored in the database at the base unit 104.

It is understood that each remote unit 102 has a unique serial number with which it can be identified.

At 604 a time slot 408 is selected from the AUP 400 within which to transmit remote unit data. The selection of the time slot 408 can be based on the instructions for selecting the time slot 408 that were received at 602 as part of the transmitting instructions. For example, the instructions may indicate a method for selecting a time slot based on a selection of digits in the serial number of the remote unit 102 or based on a random or pseudo-random number. The remote unit 102 may have the processing capability of a random or pseudo-random number generator.

The remote unit 102 can also have access to a mapping for use when selecting a time slot 408. For example, the mapping may be transmitted to the remote unit 102 as part of the instructions. By way of further example, the instructions may provide a procedure for selecting a number (e.g. using selected digit(s) of the remote unit's 102 serial number or using a pseudo random number generator) and a mapping to translate that number into one of the enumerated time slots 408.

After the enumerated time slot 408 is selected, the remote unit 102 waits until the start time associated with that enumerated time slot 408 (i.e. the start time of that time slot 408) and transmits the data, if any.

The data may be event data consisting of an event code, which can be deciphered or decoded by the base unit 104. The event data may be associated with a sensed event at the location of the remote unit 102. For example, the remote unit 102 may be associated with or may be part of an event system that has one or more sensors. When the event system senses an unusual occurrence (e.g. a broken window or unrecognized entry into a building) the remote unit 102 may transmit data that indicates the event of the unusual occurrence. There may be situations in which the remote unit 102 does not have any data to transmit, such as when there is no event occurrence. If there is no data to transmit, then the remote unit 102 disregards the instructions.

At 606, the data is transmitted to the base unit 104 in accordance with the selected time slot 408. After the remote unit 102 has carried out the instructions to select the time slot 408, the remote unit 102 waits for the start time for the next occurrence of the time slot 408 and transmits the data with a destination of the base unit 104. When the data is transmitted it can include the identification of the remote unit 102 that sent the data, the identification of any hop units (e.g. other remote units 102 or base collectors 106) along the transmission path and the identification of the emergency event or other occurrence (e.g. the emergency code).

Optionally, at 608 an acknowledgment message is received from the base unit 104. For example, the acknowledgement message can be broadcast from the base unit 104 and can indicate that the data was received at the base unit 104.

Optionally, at 610 transmitting the data to the base unit 104 consists of transmitting the data to a hop unit selected from an ordered list of hop units stored at the remote unit 102, the ordered list of hop units comprising a list of units within transmission range of the remote unit 102. For example, the hop units can consist of other remote units 102 within frequency range of the remote units 102.

Optionally, at 612 the data transmitted from of the selected hop unit is then monitored by the remote unit 102. This can occur when the remote unit 102 transmits the data to a hop unit rather than the base unit 104. For example, with reference to FIG. 1, remote unit 102 B can transmit its data to remote unit 102 A, and then remote unit 102 B listens or monitors for the transmissions from remote unit 102 A for a predetermined amount of time (e.g. 20 milliseconds) or for an amount of time that is dependent on network performance conditions. Remote units 102 can also monitor the data transmitted from the base collectors 104 within its transmission range.

Optionally, at 614, if it is then determined that data was not transmitted from the hop unit (e.g. remote unit 102 A, in the above example) then, at 616, remote unit 102 B will transmit the data to the second remote unit 102 on its hop list, which may be ordered by preference. For example, the second remote unit 102 on its hop list can be remote unit 102 D.

In an embodiment, transmitting the data to the second hop unit can include reselecting a time slot 408 based on the instructions for selecting a time slot 408. For example, the instructions received by the remote unit 102 can include instructions for selecting a time slot 408 for each successive attempt (e.g. instructions for selecting the time slot 408 for the first hop unit on the ordered list and instructions for selecting the time slot 408 on the second hop unit on the ordered list).

In one or more embodiments, the data transmitted to the base includes a request to transmit a long message. A long message may be predefined by the base unit 104 and the remote unit to include a message that takes longer to transmit than a duration of a time slot 408. In such circumstances, optionally, at 618, a polling request is then received to transmit the long message. The polling request can be sent directly to the remote unit 102 or it can be broadcast by the base unit 104 with the identification of the remote unit 102 and with an indication that it is a polling request for requesting the long message.

The remote unit 102 is provided (through the polling message) with timing or synchronizing information in order to transmit the long message at a predefined time or time interval. The predefined time or time interval can be in between two successive AUP 400 time durations.

At 620, again optionally, the long message is transmitted to the base unit 104 from the remote unit 102.

At 622, an acknowledgement may then be received at the remote unit. The acknowledgement may have been broadcast by the base unit 104 with information identifying the message as an acknowledgement of the receipt of the long message from the remote unit 102.

In one or more embodiments, the data transmissions on the communication network 100 may be performed using a single RF channel. For example, the data may be transmitted by the remote unit 102 on the single RF channel. Similarly, the transmitting instructions may be received at the remote unit on the single RF channel.

Figure 7:
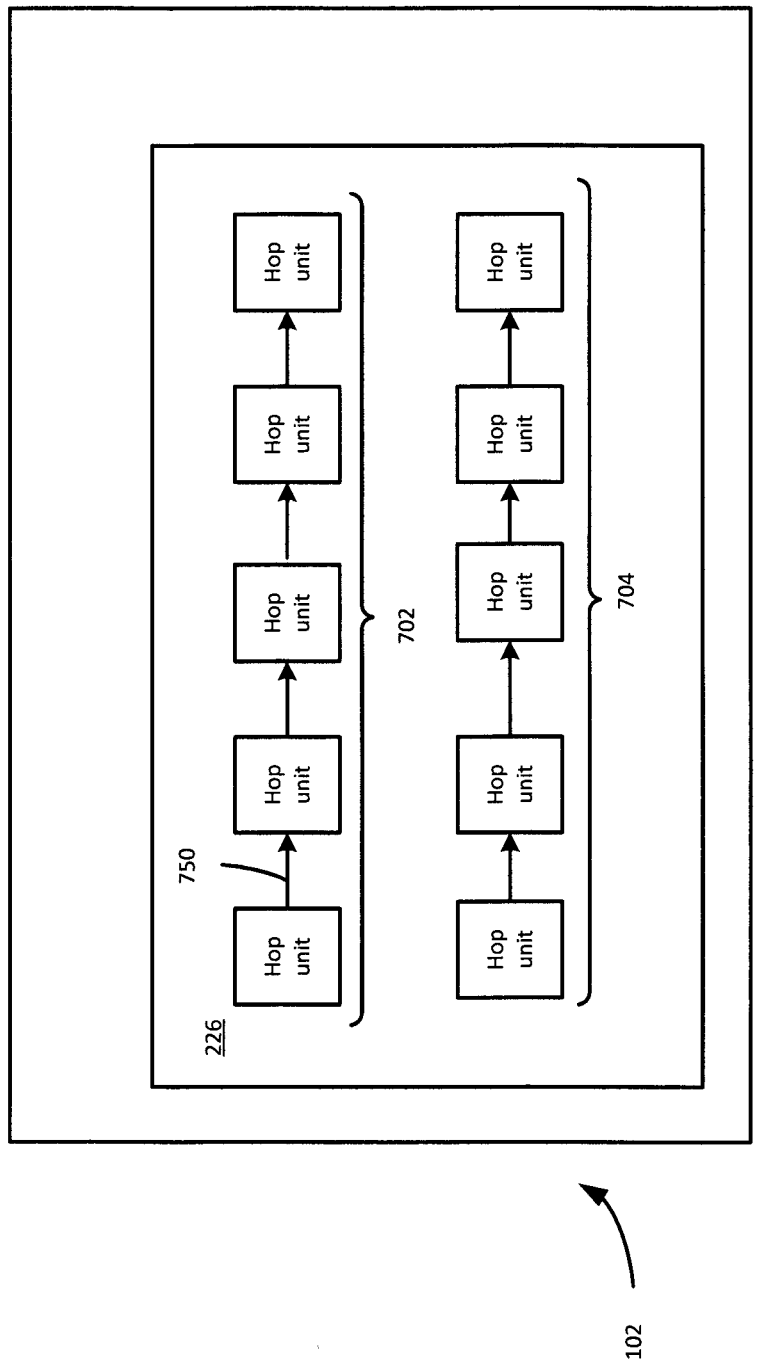
FIG. 7 is a schematic diagram of a memory of a remote unit showing a list of hop destinations and a list of eligible hop destinations.

FIG. 7 is a schematic diagram of a remote unit 102 showing only a list of hop destinations 702 and eligible hop destinations 704 stored in a memory (e.g. ROM 226) associated with the remote unit 102. As noted, with reference to FIG. 7, each remote unit 102 can maintain a list of hop destinations 702 and a list of eligible hop destinations 704. In the embodiment depicted in FIG. 7, there are 5 hop units in the list of hop destinations 702 and 5 hop units in the list of eligible hop destinations 704.

The list of hop destinations 702 for a specific remote unit 102 can comprise the identity of the hop destinations that have shown to provide highest criteria for transmissions (or retransmission) of data from the remote unit 702 out of the hop units that are within transmission range of the remote unit 702. Similarly, the list of eligible hop destinations 704 can consist of a specific number of hop units (for example, five hop units) that are the next best hop units according to criteria for retransmission of data. Accordingly, the list of hop destinations 702 can be an ordered list of hop destinations 702. The ordering is shown by the arrows (e.g. 750) that are separating each hop unit.

The criteria for evaluating whether a hop unit is on the list of hop destinations 702 or eligible hop destinations can be determined from the remote unit 102 listening for retransmissions from each hop unit (or hop destination) in its frequency range. The criteria can then be used to rank the hop units in order (for example the top 5) (i.e. the list of hop destinations 702) and the next successive set of hop units in order (for example, the next ranking 6-10) (i.e. the eligible hop destinations 704). In addition, the criteria can also be evaluated based on a polling message transmitted from the remote unit 102 to the base unit 104 through a transmission route involving one or more hop units. For example, the criteria can be used to determine whether an eligible hop unit is more favorable than a unit on the list of hop destinations 702. If so, the eligible hop unit replaces the unit on the list of hop destinations 702. Alternatively, if there is space on the list of hop destinations 702 (in some embodiments there may be a maximum size, which may be dynamic or set by the base unit 104, of the list of hop destinations 702), then the identity of the eligible hop unit can then be moved to the list of hop destinations 702 and deleted from the list of eligible hop destinations 704.

By way of example, the criteria can include the percentage of successful retransmissions from a hop unit (which may be determined from an acknowledgment message transmitted from the base unit 104 or another hop unit); the RSSI percentage (as compared to the strength of a message originally transmitted from the remote unit 102; the geographic location of the hop unit (which may be provided by the base unit 104, for example); communication facilities at the hop unit, such as IP capabilities; the number of hop units in the routing table of a hop unit; etc. In another example the latitude and longitude geographical coordinates of the originating and subsequent hop units can be incorporated in the data messages and polling responses of each unit so that all neighboring units (e.g. remote units 102 within range) are fully informed on the network configuration topology The hop destinations or hop units can be one or more of another remote unit 102, the base unit 104 or a base collector 106.

The one or more embodiments, the hop destinations, or hop units can include any of the electronic devices shown in Table 1 below. The capabilities of each different type of hop unit are also shown in Table 1.

In one or more embodiments, the list of hop destinations 702 or the list of eligible hop destinations 704 can be at least partially provided in a polling message from the base unit 104. The list of hop destinations 702 and the list of eligible hop destinations 704 can be stored in a memory 226, 228 associated with the remote unit 102. For example the memory can be a buffer memory for easy and quick access.

Figure 8:
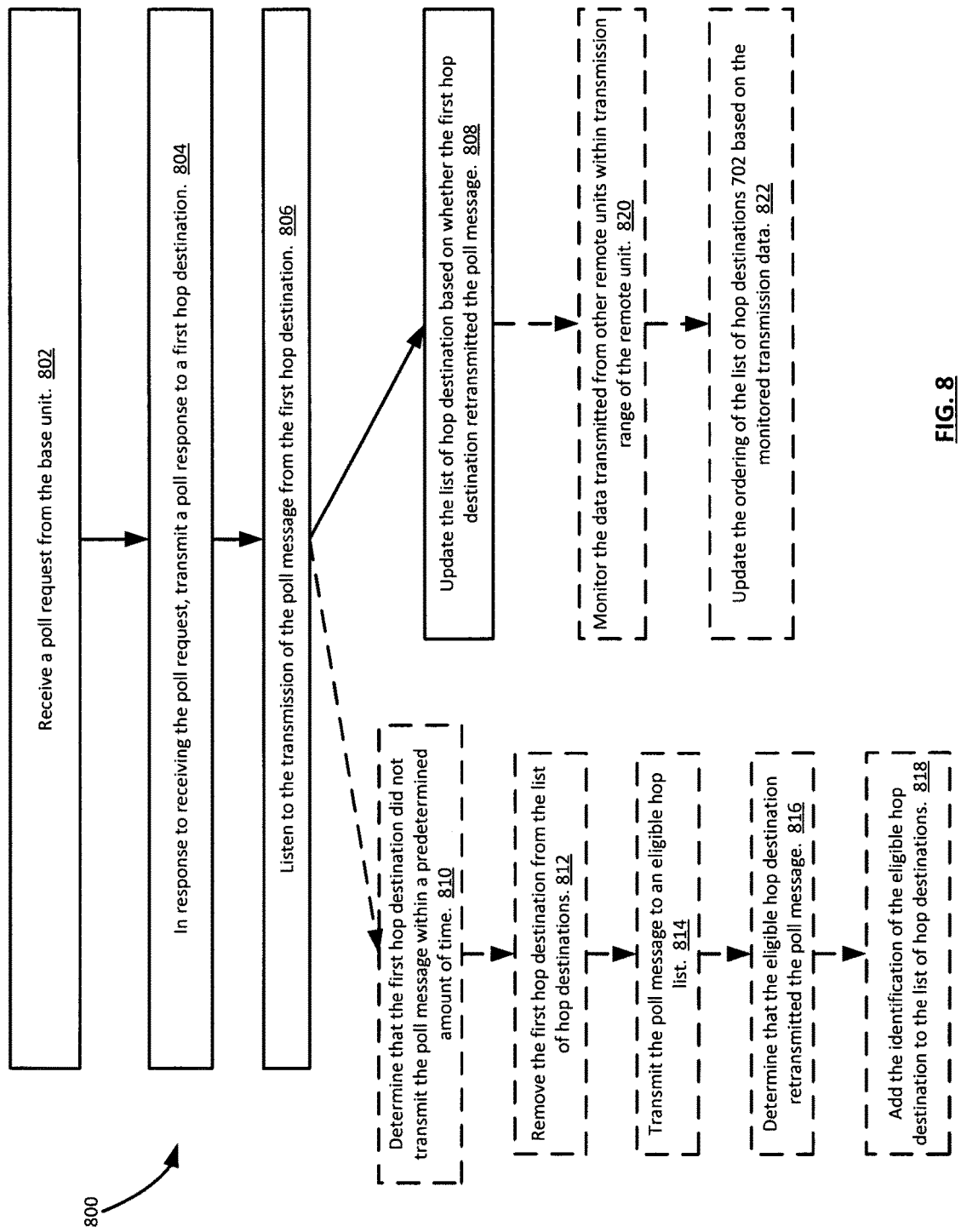
FIG. 8 is a flow chart depicting a method of managing one or more transmission routes for a remote unit in a communication network.

FIG. 8 depicts a method 800 for managing one or more transmission routes for a remote unit 102 in a communication network 100. The remote unit 102 maintains a list of hop destinations 702.

At 802, a poll request is received from the base unit 104. The poll request can be transmitted over the communication network 100. For example, the poll request can be broadcast from the base 104 intended for receipt by a specific remote unit 102. In an alternative embodiment where the specific remote unit 102 is outside of the frequency range of the base unit 104, the remote unit 102 will periodically proactively transmit verification reporting messages.

The poll request is data initiated or prepared at the base unit 104 (e.g. using the processor 238). For example, the poll request can include an identification of the remote unit 102. By way of further example, the poll request can include an identification of the first hop destination. When the remote unit 102 hears or receives the poll request it can read the data to determine that it is the intended recipient and can gather the other data included in the poll request. For example, if the poll request includes an identification of the first hop destination, then the remote unit 102 can extract the identification of the first hop destination from the poll request (if the poll request was intended for the remote unit 102) and it can transmit its response (e.g. a poll response) to the first hop destination.

At 804, in response to receiving the poll request, a poll response is transmitted to a first hop destination. For example, the remote unit 102 to who the poll request was transmitted will transmit the poll response to the first hop destination. The first hop destination can be chosen as the first hop on the list of hop destinations 702.

The remote units 102 can transmit messages to a hop unit selected from the list of hop destinations 702 based on the criteria for the best hop unit or for ranking the hop units (as explained above). The hop units in the list of hop destinations can thereby be ranks and the selection of hop units to use can be rotated. For example, each successive successful transmission of a message can be sent to the next hop unit in the ranking. Similarly if a transmission to a hop unit is

| Type | Contains RF Module | IP | Rx RF | Tx RF | Retransmits Units RF Messages | Retransmits BS RF Commands | RF Hop Distance Home | APP |
|---|---|---|---|---|---|---|---|---|
| Base Station | X | X | X | X | | X | 0 | X |
| Base Collector (IP) | X | X | X | X | X | X | 0 | X |
| Base Collector (No IP) RF, Tx | X | | X | X | X | X | 1 | X |
| Base Collector (No IP) RF, (No Tx) | X | | X | X | X | | 1 | X |
| Data Collector (with IP) | X | X | X | | | | 0 | X |
| Customer IP Unit | X | X | X | X | | | var | X |
| Normal Units | X | | X | X | X | | var | X |
| Only IP Units (No Radio) | | X | | | | | 0 | |
| Proactive Units | X | X | X | X | X | | 0 | |
| Proactive Units | X | | X | X | X | | var | | unsuccessful, the criteria of that hop unit will be negatively affected and the remote unit 102 will transmit the same message to the next hop unit in the list of ho destinations.

In one or more embodiments, the poll response can include data prepared at the remote unit 102. For example, the poll response (or poll response data) can include the identification of the first hop destination. Further, the poll response data can include information about the list of hop destinations 702 or the list of eligible hop destinations 704 associated with the remote unit 102.

At 806, a transmission (or retransmission) of the poll message from the first hop destination is listened for by the remote unit 102 to determine whether the first hop destination transmitted the poll message. For example, the remote unit 102 can listen for up to a predetermined amount of time to determine whether the poll message data was successfully retransmitted by the hop unit. The remote unit 102 can keep track of such data (e.g. the success rate or signal strength of retransmissions from particular hop units) and can store it in a memory 226, 248 for later use and evaluations. For example, such data can be used later as criteria for evaluating the ranking of certain hop units and to determine the set of hop units that are in the list of hop destinations 702 and the set of hop units that are identified in the eligible hop destinations 704.

If the hop destination has not transmitted or retransmitted the poll message within the predetermined amount of time, the remote unit 102 may consider that the poll message was not successfully transmitted from that hop destination. In such a situation, the remote unit 102, at the next polling request by the base unit 104 may then attempt to transmit the poll message to the next hop destination in the list of hop destinations 702.

In one or more embodiments, other remote units 102 can listen for the transmission of data (e.g. the poll message) from the hop unit and can make their own evaluations of the success of that hop unit.

In one or more embodiments, the hop unit adds data into the poll message. For example, the hop unit can add data into the poll message that identifies the hop unit. After the data passes through a transmission path to the base unit 104 (and potentially through one or more additional hop units), the poll message can include an identification of one or more of the hop units along the transmission path. The base unit 104 can then extract this data to determine the efficacy of such a transmission path.

At 808, the list of hop destinations 702 is updated based on whether the first hop destination retransmitted the poll message. For example, the remote unit 102 can update the criteria for evaluating whether the first hop destination should be removed from the list of hop destinations 702.

In one or more embodiments, it may be determined (optionally), at 810, that the first hop destination did not transmit the poll message within the predetermined amount of time. In such a situation (optionally) at 812, the first hop destination may be removed from the list of hop destination 702 if the hop destination has had reached a threshold number of successive failures and if there is an available hop destination from an eligible hop list. The first hop destination may be added to a black list maintained at the remote unit 102 or maintained at the base unit 104. The black list is a list of hop destinations that are not to be used or that are inactive. The first hop destination may only be added to the black list if it has been determined to be inactive in a predetermined number of successive attempts, for example.

The black list may be used for remote units 102 that are not to be used for an extended period of time. According to an embodiment, a remote unit can be added to the black list only from the list of eligible hop destinations 704, as follows: If a hop unit from the list of eligible hop destinations 704 has a condition causing it to be listened to by the remote unit 102, but that the remote unit 102 cannot reach that hop unit on the list of eligible hop destinations 704, then the hop unit from the list of eligible hop destinations 704 is placed on the black list. This can be implemented in order to conserve processing resources.

In another embodiment, remote units 102 can be added into the black list from either the list of hop destinations 702 or the list of eligible hop destinations 704 by direct instruction from the base unit 104 to the remote unit(s) 102.

A remote unit 102 (or hop unit) can be removed from the black list if one of the following conditions occur: a time period (which may be determined at the base unit 104) for maintaining the remote unit 102 on the black list expires; the base unit 104 directly remove the remote unit 102 from the black list; or the communication network 100 or the remote unit 102 conditions change in a way that requires reorganization of the list of hop destinations 702 and the list of eligible hop destinations 704.

Optionally at 814, the poll message is transmitted to an eligible hop destination from eligible hop list. As noted above, the eligible hop list 704 can include the identification of one or more hop destinations that are not on the list of hop destinations 702 but that are in the frequency range of the remote unit 102. The poll message may be transmitted to a hop unit on the list of eligible hop destinations 704 after it is determined that the communication to all hop units in the list of hop destinations 702 failed, each within a predetermined amount of time (at 810), for example.

Optionally at 816, it may be determined at the remote unit 102 that the eligible hop destination retransmitted the poll message. For example, the remote unit 102 may have been listening for transmissions from the eligible hop destination.

Optionally at 818, the identification of the eligible hop destination is added the list of hop destinations 702 if the eligible hop destination has better qualifications than any of the hop units on the list of hop destinations 702. For example, the hop destination on the list of hop destinations 702 may be removed from the list of hop destinations 702 (and may be placed on the list of eligible hop destinations 704) for the remote unit 102. This may be in response to step 816.

Optionally at 820, after the list of hop destinations 702 is updated based on whether the first hop destination retransmitted the poll message, the data transmitted from other remote units 102 within transmission range of the remote unit 102 may be monitored. For example, the transmissions or retransmissions from other remote units 102 may be in response to other polling requests and may provide transmission route information or hop destination criteria for further updating the list of hop destinations 702 or the list of eligible hop destinations 704.

Optionally at 822, the ordering of the list of hop destinations 702 is updated based on the monitored transmission data. For example, the monitored transmission data may provide criteria for ranking the efficiency or success of the hop units in the list of hop destinations 702. For example, the list of hop destinations is updated based on one or more of a target signal strength of the data transmitted from the remote units 102, the power level of the remote units 102, a rank of the remote units 102 and a traffic load on the remote units 102. The target signal strength can be in a predefined signal strength level of the initial signal strength, for example. An example of a predefined signal strength level is between 50% and 60%.

Figure 9:
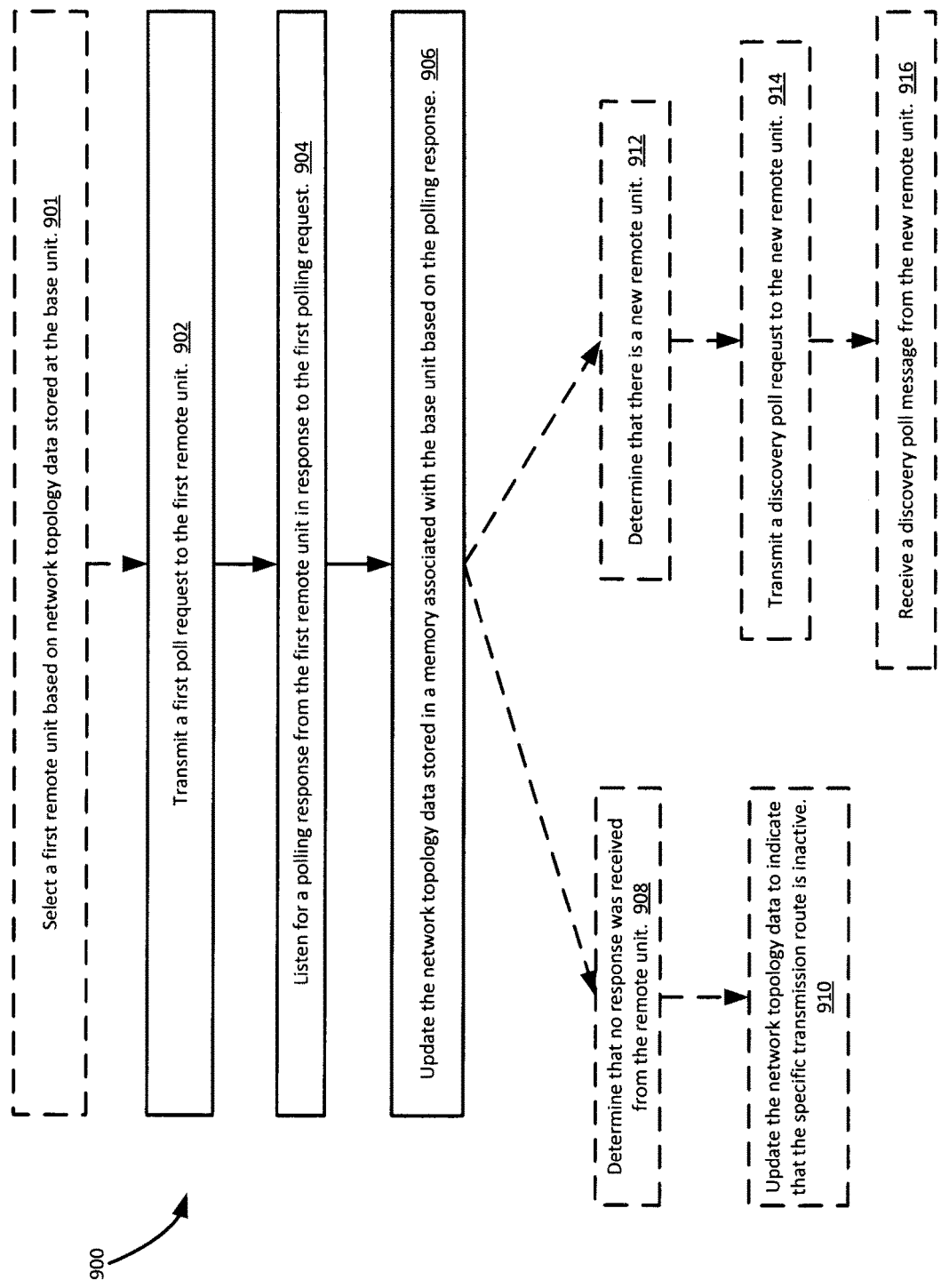
FIG. 9 is a flow chart depicting a method of managing the transmission routes in a communication network.

FIG. 9 is a flow chart showing an exemplary method 900 of managing the transmission routes in a communication network 100. The communication network 100 can be the network described in relation to FIG. 1, such that the communication network 100 can include a base unit 104 and a plurality of remote unit 102.

At 901, optionally, a first remote unit 102 is selected based on network topology data stored at the base unit 104 (e.g. in memory 226, 248). The first remote unit 102 is one of the plurality of remote units 102 in the communication network 100.

At 902, a first poll request is transmitted to the first remote unit 102. For example, the first poll request can be transmitted by the base unit 104 using a targeted message or a broadcast.

At 904, a polling response from the first remote unit 102 in response to the first polling request is listened for. For example, the base unit 104 can listen for a response from the first remote unit 102, which may travel through one or more transmission routes in the communication network 100.

The polling response can include an identification of at least one hop destination associated with the first remote unit 102. For example, the at least one hop destination identified in the polling response can be a hop unit that was passed through in the transmission route to the base unit 104. By way of further example, the polling response may include information regarding the first remote unit 102 such as the following: remote unit 102 power level, the number of hop units in the list of eligible hop destinations 704 for that remote unit 102, the number of hop units in its list of hop destinations 702, the number of messages in a memory buffer of remote unit 102, geographical zone information associated with the remote unit 102, remote unit 102 rank information, hop distance to base unit 104, geographical coordinates (latitude and longitude, hardware configuration, firmware version, unit status, traffic information), etc.

At 906, a network topology data stored in a memory 226, 248 associated with the base unit 104 is updated based on the polling response. The network topology data can include identities of one or more remote units 102 in the communication network 100 and the geolocations (or geographical zones) of one or more remote units 102 in the communication network 100.

In one or more embodiments, such as when the polling response includes data indicating a hop destination on the transmission route, the network topology data is updated to indicate that the transmission route between the first remote unit 102 and the at least one hop destination is active. By way of further example, first polling response can also include the geographic location of the hop destination and the network topology data can be updated to include the geographic location of the hop destination.

In one or more embodiments, the network topology data also includes one or more transmission path between the remote units 102 and the base unit 104. The transmission paths can be defined as ordered sets of hop destinations. In such embodiments, the polling response can also include data associated with one or more transmission criteria associated with the hop destination. Further, the network topology data can update the ordered set of hop destinations using the on one or more transmission criteria associated with the hop destination.

In one or more embodiments, the polling request can include instructions directed to a remote unit 102 to respond to the polling request using a specific transmission route. For example, the polling request can identify the specific hop units to transmit the polling response through in order to reach the base unit 104. For example, the network topology data can include a list of destination hops (or hop units) associated with each remote unit 102. In such embodiments, the polling response may be a null response indicating that no response was received. Optionally, at 908, it is determined that no response was received from the remote unit 102. Further, at 910, the network topology data is updated to indicate that the specific transmission route (as identified in the polling request) is inactive.

Optionally, at 912, it is determined that there is a new remote unit 102. For example, a new remote unit 102 may have been installed at a specific geographic location and is now ready or provisioned to be included in the communication network 100. The location and identity (e.g. serial number) of the new remote unit 102 may be entered into the memory 226, 248 of the base unit 104 manually, for example.

Optionally, at 914, a discovery poll request is transmitted to the new remote unit 102. The discovery poll request can be broadcast with the identity of the new remote unit 102 so that the new remote unit 102 can receive it.

It is understood that in some situations the remote unit 102 can determine and select its own hop destination without directions from the base unit 104.

Optionally, at 916, a discovery poll message is received from the new remote unit 102. For example, the discovery poll message can be received at the base unit 104 and can identify a list of hop destination 702 stored at the new remote unit 102. The list of hop destinations 702 includes a list of one or more hop destinations within transmission range of the new remote unit 102.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is the following:

1. A method for requesting data from a set of remote units in a network, the method comprising:

defining an Asynchronous Ubiquitous Protocol, the Asynchronous Ubiquitous Protocol comprising a schedule of a plurality of time slots, each time slot defined by a distinct start time and end time pair, the start time and end time pairs defining a set of non-overlapping time slots within which data may be transmitted, wherein the plurality of time slots of the schedule are unallocated time slots eligible to be selected by remote units;

broadcasting transmitting instructions to the set of remote units, the transmitting instructions comprising the Asynchronous Ubiquitous Protocol and selection instructions, the selection instructions specifying a procedure to be used by the remote units to select time slots from the Asynchronous Ubiquitous Protocol to use for data transmission; and receiving data transmitted from a remote unit in the set of remote units in accordance with the transmitting instructions, the data indicating an emergency event or occurrence.

2. The method of claim 1 further comprising transmitting an acknowledgement message to the remote unit.

3. The method of claim 1, wherein the number of times slots and the duration of the time slots are dynamic and dependent on the performance of the communication network.

4. The method of claim 1 further comprising:
monitoring one or more conditions of the network, and wherein the Asynchronous Ubiquitous Protocol is defined based on the monitored one or more conditions.

5. The method of claim 4 wherein the one or more conditions comprise one of:
an increased rate of data retransmission; an increase in the number of poll requests from remote units; and an increase in the number of timeslots within which data is not included.

6. The method of claim 1 wherein receiving data transmitted from one or more of the set of remote units comprises extracting data from one or more of the time slots.

7. The method of claim 6 further comprising: associating the data with a remote unit based on a portion of the extracted data.

8. The method of claim 1, wherein the instructions specifying a procedure to be used by the remote units to select a time slot comprise one of:
instructions to select a time slot based on selected digits of the serial number of the remote unit, instructions to select a time slot based on a pseudo-random number, and instructions to select a time slot based on the geo-location of the remote unit.

9. The method of claim 1 further comprising, polling one or more remote units directly to request polling data.

10. The method of claim 9 wherein the polling data comprises a confirmation of the existence that a functioning transmission path to the remote unit.

11. The method of claim 1 wherein the data is received on a single radio frequency channel.

12. The method of claim 11 wherein the transmitting instructions are broadcast on the single radio frequency channel.

13. The method of claim 1 wherein the data transmitted from the remote unit comprises a request to transmit a long message, wherein the long message comprises a message that takes longer to transmit than a duration of the time slot.

14. The method of claim 13 further comprising:
in response to receiving the data transmitted from the remote unit, transmitting a polling request directly to the remote unit to request the long message;
receiving the long message; and
transmitting an acknowledgement to the remote unit that the long message was received.

15. A method of transmitting data from a remote unit to a base, the method comprising:
receiving, at a remote unit, transmitting instructions from the base, the transmitting instructions comprising an Asynchronous Ubiquitous Protocol and selection instructions, the selection instructions specifying a procedure to be used by the remote unit for selecting a time slot from the Asynchronous Ubiquitous Protocol, the Asynchronous Ubiquitous Protocol comprising a schedule of a set of time slots each defined by a start time and end time pair, the start time and end time pairs defining a set of non-overlapping time slots within which data may be transmitted, wherein the plurality of time slots of the schedule are unallocated time slots eligible to be selected by remote unit;
selecting a time slot from the Asynchronous Ubiquitous Protocol within which to transmit remote unit data, the selection based on the selection instructions for selecting the time slot; and
transmitting the data to the base in accordance with the selected time slot, the data indicating an emergency event or occurrence.

16. The method of claim 15 further comprising receiving an acknowledgment message from the base.

17. The method of claim 15, further comprising transmitting the data to a hop unit selected from an ordered list of hop units stored at the remote unit, the ordered list of hop units comprising a list of units within transmission range of the remote unit.

18. The method of claim 17, further comprising monitoring the data transmitted from of the selected hop unit.

19. A communication network for reducing signal collision when transmitting data from one or more remote units out of a set of remote units, the network comprising:
a set of one or more remote units, each remote unit arranged to transmit data;
a base for communicating with the set of one or more remote units and for managing the communication network, the base associated with a database and with a processor, the processor configured to:
define an Asynchronous Ubiquitous Protocol, the Asynchronous Ubiquitous Protocol comprising a schedule of plurality of time slots, each time slot defined by a distinct start time and end time pair, the start time and end time pairs defining a set of non-overlapping time slots within which data may be transmitted, wherein the plurality of time slots of the schedule are unallocated time slots eligible to be selected by remote units;
broadcast transmitting instructions the set of remote units, the transmitting instructions comprising the Asynchronous Ubiquitous Protocol and selection instructions, the selection instructions specifying a procedure to be used by the remote unit for selecting a time slot from the Asynchronous Ubiquitous Protocol to use for data transmission; and
receive data transmitted from one of the remote units in the set of one or more remote units in accordance with the transmitting instructions, the data indicating an emergency event or occurrence.

* * * * *